Patented Oct. 29, 1940

2,220,033

UNITED STATES PATENT OFFICE 2,220,033

INTERPOLYMER OF ACRYLIC NITRILE, METHYL METHACRYLATE, AND METHACRYLIC AMIDE

Walter Bauer, Darmstadt, and Franz Esser, Gundernhausen, Germany, assignors to Röhm & Haas Company, Philadelphia, Pa.

No Drawing. Application February 15, 1939, Serial No. 256,490. In Germany February 17, 1938

3 Claims. (Cl. 260—84)

This invention relates to joint polymers containing three principal ingredients, viz: a lower alkyl methacrylate, acrylic nitrile and methacrylic amide. It relates more particularly to joint polymers in which the relative amounts of the three ingredients are within certain definite ranges.

In the application of Walter Bauer, Ser. No. 197,193 filed March 21, 1938, joint polymers of lower methacrylates and acrylic nitrile are disclosed in which the amount of the ester varies from about 60 to about 20% of the total polymer. Such polymers have physical properties which distinguish them from other joint polymers. In particular, their tensile strength, hardness and resistance to solvents are superior to other joint polymers of similar nature.

It has now been found that, if a relatively small percentage, up to about 15%, of methacrylic amide is added to the mixture of lower alkyl methacrylate and acrylic nitrile, the same physical properties are still further improved. The improvement is quite pronounced when about 3 to 8% of methacrylic amide is added to a 70/30 mixture of acrylic nitrile and methyl methacrylate.

The joint polymers contemplated by the present invention are those which are made from a mixture of four parts of acrylic nitrile, from one to six parts of a lower alkyl methacrylate and up to 15% of methacrylic amide based on the total weight of the mixture. The lower alkyl esters of methacrylic acid such as the methyl, ethyl, propyl and butyl esters are the ones which give the best results.

The invention may be illustrated by the following examples:

Example 1

95 parts of a mixture of 70 parts of acrylic nitrile and 30 parts of methyl methacrylate is mixed with 5 parts of methacrylic amide. The mixture is partially polymerized in the presence of a small amount of catalyst such as benzoyl peroxide and a regulator such as turpentine until a fairly thick syrup is formed. This is then poured into a mold made of glass sheets such as is described in U. S. Patent No. 2,091,615 and heated for about two days at 30–50° C. Thick plates require a longer time at a lower temperature, for example, four days at 30° C. The temperature is then raised gradually during the course of one or two days to about 110° C. In this manner a bubble-free, slightly yellow plate is obtained which is transparent and has excellent physical properties. The tensile strength, impact strength, and softening point are all superior to those of a similar joint polymer made without the addition of the methacrylic amide as may be seen from the following which show the effect of adding 5% of methacrylic amide to the 70/30 acrylic nitrile/-methyl methacrylate mixture.

| | With methacrylic amide | Without methacrylic amide |
|---|---|---|
| Tensile strength, kg./cm.² | 1000–1150 | About 950. |
| Impact strength, kgcm./cm.² | About 40 | About 30. |
| Softening point (Vicat) | 105° C | 96° C. |

With respect to other properties this joint polymer is superior to all other known polymers. It has a hardness measured with a 5 mm. steel ball under a pressure of 50 kg. maintained for 10 and for 60 seconds as follows:

5/50/10   2350 kg./cm.²
5/50/60   2180 kg./cm.²

These values were calculated from the formula—

$$h = \frac{p}{\pi \cdot d \cdot 1}$$

according to the German Din-Norm. VDE 0302 in which $h$ is the hardness is kg./cm.², $p$ the pressure in kg., $d$ the diameter of the ball in cm. and 1 the distance in cm. to which the ball penetrates measured while the load is applied. Modulus of elasticity 49,000 kg./cm.². It absorbs only 0.3% of solvent when immersed in a mixture of equal parts (by weight) of ethyl alcohol, gasoline and benzene at 60° C. for six hours, 0.8% when immersed at 20° C. for six months.

The slight yellow or reddish yellow color which develops on polymerization can be neutralized by a small amount of a soluble blue dye such as indanthrene blue which is added before polymerization. The sheet thus obtained is practically colorless but has a greenish cast similar to ordinary window glass.

Example 2

A product similar to the one described in Example 1 may be made by polymerizing a mixture of 7.5 parts of methacrylic amide and 92.5 parts of a mixture of 40 parts of acrylic nitrile and 60 parts of methyl methacrylate.

The joint polymers of the present invention may be mixed with other polymerizable or unpolymerizable materials or with fillers, plasticizers, pigments, etc., and used as molding materials.

We claim:

1. A composition of matter obtained by polymerizing a mixture containing four parts of acrylic nitrile, from one to six parts of a lower alkyl methacrylate having less than five carbon atoms in the alkyl radical and between about 3% and about 15% of methacrylic amide calculated on the total weight of the mixture.

2. A composition of matter obtained by polymerizing a mixture containing four parts of acrylic nitrile, from one to six parts of methyl methacrylate and between about 3% and about 15% of methacrylic amide calculated on the total weight of the mixture.

3. A composition of matter obtained by polymerizing a mixture containing four parts of acrylic nitrile, about 1.7 parts of methyl methacrylate and from 3 to 8% of methacrylic amide calculated on the total weight of the mixture.

WALTER BAUER.
FRANZ ESSER.